(12) United States Patent
Lee et al.

(10) Patent No.: US 6,651,506 B2
(45) Date of Patent: Nov. 25, 2003

(54) DIFFERENTIAL CAPACITIVE PRESSURE SENSOR AND FABRICATING METHOD THEREFOR

(75) Inventors: Dae-Sung Lee, Pyeongtaek-si (KR); Hyo-Derk Park, Pyeongtaek-si (KR); Kyoung-Il Lee, Seoul (KR); Yoo-Jin Lee, Seoul (KR); Yeon-Shik Choi, Seoul (KR)

(73) Assignee: Korea Electronics Technology Institute (KR)

( * ) Notice: Subject to any disclaimer, the term of this patent is extended or adjusted under 35 U.S.C. 154(b) by 0 days.

(21) Appl. No.: 10/100,826

(22) Filed: Mar. 15, 2002

(65) Prior Publication Data

US 2002/0194919 A1 Dec. 26, 2002

(30) Foreign Application Priority Data

Jun. 9, 2001 (JP) .......................................... 2001-32277

(51) Int. Cl.[7] ................................................ G01L 9/12
(52) U.S. Cl. ............................ 73/718; 73/724; 73/754; 361/283.4; 361/283.3
(58) Field of Search .......................... 73/718, 724, 754, 73/715–727, 753–757; 361/283.4, 283.3

(56) References Cited

U.S. PATENT DOCUMENTS

| | | | |
|---|---|---|---|
| 5,178,015 A | | 1/1993 | Loeppert et al. |
| 5,332,469 A | * | 7/1994 | Mastrangelo ................ 216/2 |
| 5,600,072 A | * | 2/1997 | Chen et al. ................... 73/724 |
| 5,925,824 A | | 7/1999 | Soma et al. |
| 6,156,585 A | * | 12/2000 | Gogoi et al. ................. 438/48 |
| 6,330,165 B1 | * | 12/2001 | Kohjiro et al. ............. 174/250 |
| 6,470,754 B1 | * | 10/2002 | Gianchandani ............. 73/718 |

* cited by examiner

Primary Examiner—Edward Lefkowitz
Assistant Examiner—Jermaine Jenkins
(74) Attorney, Agent, or Firm—Anderson Kill & Olick, PC

(57) ABSTRACT

A pressure sensor using two capacitors for measuring a pressure stimulus includes a substrate having a diaphragm positioned at a center portion thereof. The diaphragm has a reduced thickness so that the diaphragm displaces upward and downward in response to a pressure stimulus. A first capacitor is provided on the diaphragm and at least a second capacitor is provided on a bulk portion of the substrate so as to be adjacent to the first capacitor. The first and the second capacitor are connected to each other in series, wherein capacitance differs between the first and the second capacitor when the diaphragm moves up and down in response to the pressure stimulus.

11 Claims, 11 Drawing Sheets

DIFFERENTIAL CAPACITIVE PRESSURE SENSOR AND FABRICATING METHOD THEREFOR

FIELD OF THE INVENTION

The present invention relates to a differential capacitive pressure sensor and a fabricating method therefor; and, more particularly, to a differential capacitive pressure sensor that implements a superior linearity and a simple fabricating method therefor.

BACKGROUND OF THE INVENTION

Various instruments, such as a measuring instrument or a controller, employ a pressure sensor to measure a pressure in a process or a system. The pressure sensor generally uses displacement, deflection, frequency of oscillation, or magnetic-thermal conductivity, each varying in response to a pressure stimulus.

Recently, a semiconductor pressure sensor, having a smaller size and being more combined, is getting attention for the development of a semiconductor technology and a micro-machining technology. Since creep rarely occurs in the semiconductor pressure sensor, a superior linearity can be obtained. Further, the semiconductor pressure sensor is small, lightweight, and very strong against vibration. Compared with a mechanical sensor, the semiconductor pressure sensor is more sensitive, more reliable, and presents a higher production yield.

In a typical semiconductor pressure sensor, a pressure stimulus causes distortion or strain of a diaphragm, which is usually formed of a monocrystalline silicon. Though a natural frequency change of a vibrator or a surface elastic wave occurring on a surface of the diaphragm can be used to convert the distortion or strain thereof into an electrical signal, the typical semiconductor pressure sensor is generally classified into a capacitive type and a piezoresistive type.

The piezoresistive pressure sensor is formed by diffusing impurities onto a semiconductor and has advantages such as easy fabrication and superior linearity. Though a simplified processing circuit can be applied in the piezoresistive pressure sensor, a correction circuit is usually added thereto to overcome a poor temperature characteristic thereof.

In the capacitive pressure sensor, an exterior stimulus, i.e., pressure or stress, causes a change in a gap interposed between opposing electrodes, so that capacitance therebetween is changed. The amount of the changed capacitance is then converted into an electrical signal, which involves with the magnitude of the stress or the pressure. Compared with the piezoresistive type, the capacitive pressure sensor has a smaller size as well as a better temperature characteristic.

The capacitive pressure sensor, however, has a relatively poor linearity, because the capacitance is inversely proportional to the interval between the opposing electrodes. The linearity thereof becomes more rapidly deteriorated as the capacitive pressure sensor is used for measuring a wider range of stimulus.

Mitsuhiro Yamada, et al., have disclosed a compensation method for improving linearity of a capacitive pressure sensor in a paper, "A Capacitive Pressure Sensor Interface Using Oversampling Δ–Σ Demodulation Techniques," IEEE Transactions on Instrumentation and Measurement, Vol. 46, No. 1, February 1997. Since the above-mentioned method uses a look-up table, data is digitally stored or input to a circuit. Consequently, a continuous compensation is impossible, and therefore an irregular variance in the output of the sensor is a fatal drawback.

For achieving an improved linearity, a differential capacitive pressure sensor is further suggested. When a pressure acts on a typical differential capacitive pressure sensor, a first displacement $(+)\Delta d$ and a second displacement $(-)\Delta d$ are respectively involved with a first sensing capacitor "C1" and a second sensing capacitor "C2" thereof. The first and the second sensing capacitor "C1" and "C2" respectively present a first capacitance and a second capacitance, which are also respectively referred to as "C1" and "C2" for the sake of convenience. Because the absolute value "$\Delta d$" of the first and the second displacement is usually very small, a capacitance difference "$\Delta C$" between the first and the second capacitance "C1" and "C2" ($\Delta C = C1 - C2$) is in proportion to the absolute value "$\Delta d$" thereof. Accordingly, the differential capacitive pressure sensor implements a superior linearity, and effects of a parasitic capacitance are almost excluded.

U.S. Pat. No. 5,925,824 by Shinichi Soma, et al., discloses a conventional differential capacitive pressure sensor. In the conventional differential capacitive pressure sensor, an insulator and a conductive plate, each having a concentric through hole, are sequentially assembled on opposing surfaces of a common conductive plate, such that two capacitors are respectively formed on both opposing surfaces of the common conductive plate. The above-explained structure is difficult to fabricate and therefore its production yield is low. Further, the structure is unsuitable for a small-sized sensor and presents a relatively low sensitivity.

ChuanChe Whang, et al., have disclosed another conventional differential capacitive pressure sensor in a paper, "Contamination-Insensitive Differential Capacitive Pressure Sensors", Journal of MEMS, Vol. 9, No. 4, December 2000. The above-mentioned pressure sensor is fabricated by applying a micro-machining technology, so that two sensing capacitors are formed on a membrane that can elastically deflects in response to a pressure stimulus.

The above-mentioned differential capacitive pressure sensor includes a lower electrode, a center electrode, and an upper electrode. The lower electrode is a polysilicon membrane, and the center electrode is supported by a leg formed on a bulk silicon substrate, which presents no deflection. The upper electrode is disposed over the lower electrode and a supporter is interposed therebetween to support the upper electrode. When the lower electrode deflects in response to the pressure stimulus, the upper electrode also deflects as much as the lower electrode does.

Since the above-explained differential capacitive pressure sensor is hermetically sealed, contamination by particles is prevented. Further, because two capacitors thereof are respectively arranged on an upside and a downside, a large fill factor can be obtained, so that the temperature characteristic and the linearity thereof are superior.

In the above-explained differential capacitive pressure sensor, however, because two sacrificial layers are used during a fabrication process therefor, the fabrication process is very complicated. Further, unless gaps between the upper and the lower electrode are continuous, there occurs a difference in capacitances between the two capacitors. Because the thickness of the sacrificial layers determines the above-mentioned gaps, the sacrificial layers are required to have a same thickness. The two sacrificial layers, however, are very difficult to have the same thickness.

Further, because the support is made of an insulating material or a conductive material covered by an insulator, additional processes are required for forming the support or the insulator. Furthermore, because the support interposed between the upper and the lower electrode supports only the upper electrode, the deflection of the lower electrode differs from that of the upper electrode. In other words, the support causes a difference in deflection between the upper and the lower electrode, thereby deteriorating the accuracy of the sensor

SUMMARY OF THE INVENTION

It is, therefore, an object of the present invention to provide a differential capacitive pressure sensor that includes two capacitors arranged in such a way that a fabrication process therefor is relatively easy.

It is another object of the present invention to provide a differential capacitive pressure sensor that provides a superior linearity by maintaining an equal gap between an upper electrode and a lower electrode of each capacitor.

In accordance with one aspect of the invention, a preferred embodiment of the present invention provides a differential capacitive pressure sensor, which includes: a substrate including a diaphragm positioned at a center portion thereof, the diaphragm having a reduced thickness; a first to a third lower electrode sequentially arranged on the substrate, the second lower electrode being positioned corresponding to the diaphragm, the first lower electrode and the second lower electrode being electrically connected to each other; a first to a third upper electrode respectively floating over the first to the third lower electrode, the second upper electrode crossing over the second lower electrode; and a first to a third supporting member downwardly extending from the first to the third upper electrode, respectively, the first and the second supporting member contacting the second lower electrode.

Another preferred embodiment of the present invention provides a differential capacitive pressure sensor, which includes: a substrate including a diaphragm positioned at a center portion thereof, the diaphragm having a reduced thickness; a first to a third lower electrode sequentially arranged on the substrate, the second lower electrode being positioned corresponding to the diaphragm, the first lower electrode and the second lower electrode being electrically connected to each other; a first to a third upper electrode respectively floating over the first to the third lower electrode, the second upper electrode crossing over the second lower electrode; and a first to a third supporting member downwardly extending from the first to the third upper electrode, respectively, the first and the second supporting member contacting the second lower electrode.

In accordance with another aspect of the invention, there is provided a method for fabricating a differential capacitive pressure sensor, the method including the steps of: forming lower electrodes on a substrate; forming a sacrificial layer on the substrate to cover the lower electrodes; forming a plurality of via holes passing through the sacrificial layer to uncover portions of the lower electrodes; forming the upper electrodes by depositing a conductive material on the sacrificial layer, the conductive material filling the via holes so that the supporting members are formed; and removing the sacrificial layer.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

Referring now to FIGS. 1 to 8, a differential capacitive pressure sensor in accordance with preferred embodiments of the present invention will be described in detail. Like numerals represent like parts in the drawings.

Figure 1:
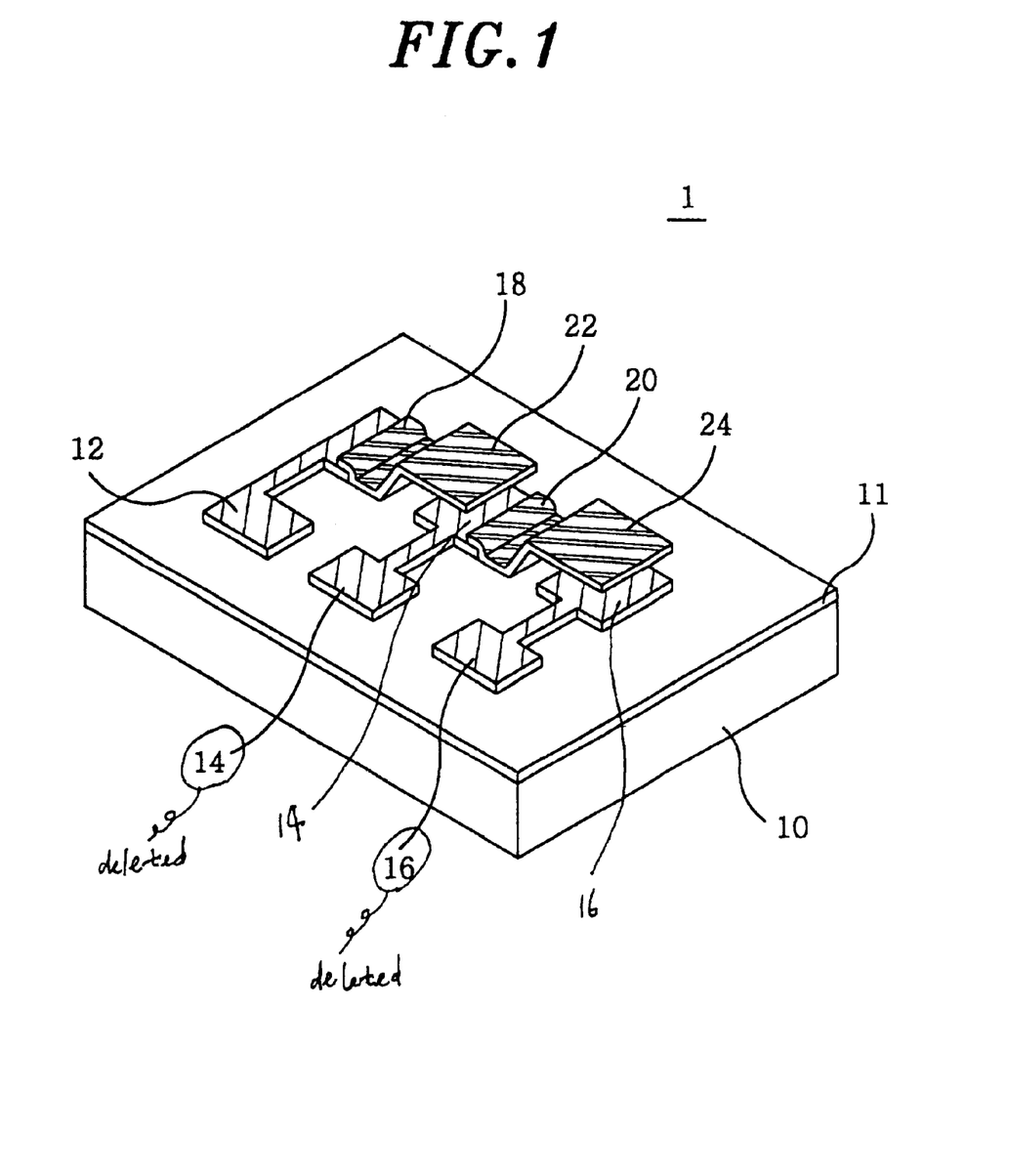
FIG. 1 illustrates a perspective view of a differential capacitive pressure sensor in accordance with a first preferred embodiment of the present invention.

In FIG. 1, a differential capacitive pressure sensor 1 in accordance with a first preferred embodiment includes an outer electrode 12, a first lower electrode 14, a second lower electrode 16, and a semiconductor substrate 10. The outer electrode 12, the first lower electrode 14, and the second lower electrode 16 are sequentially disposed on the semiconductor substrate 10 in that order. Between the adjacent electrodes, predetermined intervals are respectively interposed.

The pressure sensor 1 further includes a first upper electrode 22, a second upper electrode 24, a first supporting member 18, and a second supporting member 20. The first and the second upper electrode 22 and 24 are respectively disposed over the first and the second lower electrode 14 and 16 with an equal gap interposed therebetween. The first supporting member 18 connects the outer electrode 12 with the first upper electrode 22, and the second supporting member 20 connects the first lower electrode 14 with the second upper electrode 24. The first and the second supporting member 18 and 20 respectively support the first and the second upper electrode 22 and 24, so that the first and the second upper electrode 22 and 24 are maintained parallel to the first and the second lower electrode 14 and 16, respectively.

The differential capacitive pressure sensor 1 preferably further includes an upper insulating layer 11 disposed on a top surface of the semiconductor substrate 10. The upper insulating layer 11 serves to electrically separate the semiconductor substrate 10 from the above-explained electrodes.

Figure 2A:
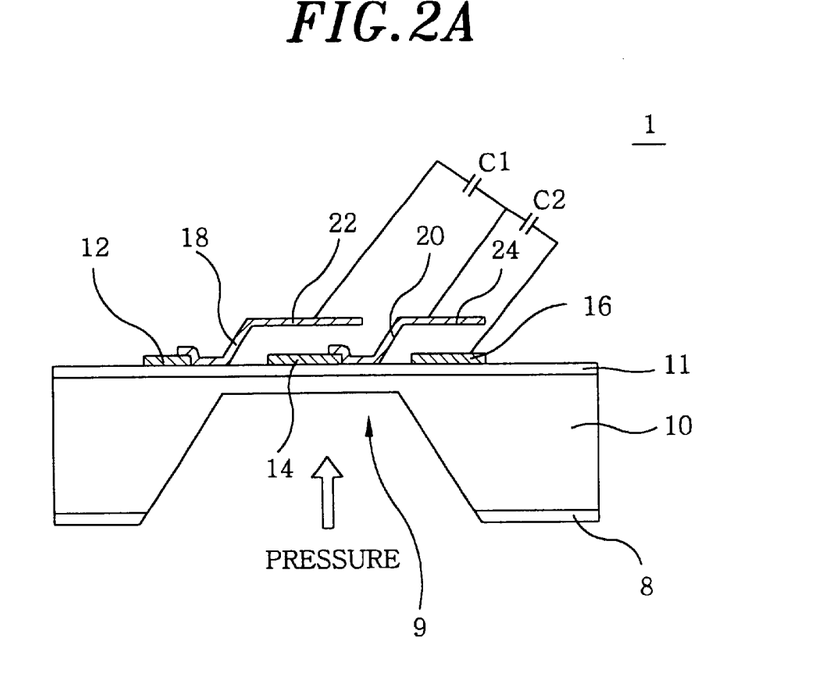
FIGS. 2A and 2B show vertical sectional views of the differential capacitive pressure sensor illustrated in FIG. 1.

The first lower electrode 14 and the first upper electrode 22 form a first capacitor "C1" (in FIG. 2A), and the second lower electrode 18 and the second upper electrode 24 form a second capacitor "C2" (in FIG. 2A). When a stimulus, i.e., pressure is applied to the differential capacitive sensor 1, the first lower electrode 14 and the second upper electrode 24 are simultaneously displaced by an equal amount because the second supporting member 20 is interposed between the first lower electrode 14 and the second upper electrode 24. Consequently, gaps of the first and the second capacitor "C1" and "C2" are respectively displaced in different directions but by equal amounts.

As previously explained, the first and the second capacitor "C1" and "C2" initially have gaps of a same size interposed between the upper and the lower electrode thereof. Gap distances are preferably reduced below a few micrometers ($\mu$m), so that the first and the second capacitor "C1" and "C2" present a large capacitance. The larger capacitances can improve the sensitivity of the sensor.

In FIG. 2A, the semiconductor substrate 10 preferably has a diaphragm 9, having a reduced thickness, under peripheries of the first lower electrode 14. The diaphragm 9 may be formed of a trench shape by applying an etching. When a pressure is applied to the differential capacitive pressure sensor 1, the diaphragm 9 is deflected in response thereto. Disposed on a bottom surface of the semiconductor substrate 10 is a lower insulating layer 8.

One of the first and the second capacitor "C1" and "C2" is disposed on the diaphragm 9 of the semiconductor substrate 10, and the other is disposed on bulk portions thereof. There occurs little deflection in the bulk portions of the semiconductor substrate 10.

Capacitances "$C1_0$" and "$C2_0$" of the first and the second capacitor "C1" and "C2" can be expressed by Equations 1 and 2, respectively.

$$C1_0 = \varepsilon \frac{A}{d_0}. \quad \text{Equation 1}$$

$$C2_0 = \varepsilon \frac{A}{d_0}. \quad \text{Equation 2}$$

In Equations 1 and 2, "$d_0$" represents a vertical distance between each upper electrode and a corresponding lower electrode; "A" represents an overlapped area of the upper and the lower electrode; and "$\varepsilon$" represents a dielectric constant. As seen from the above-mentioned Equations 1 and 2, the first and the second capacitor "C1" and "C2" have same capacitances.

When the first and the second capacitor "C1" and "C2" are oppositely deflected by a displacement "$\delta$", a difference between the capacitances of the first and the second capacitor "C1" and "C2" is expressed by Equation 3.

$$\Delta C = C1 - C2 = \varepsilon \frac{A}{d_0 - \delta} - \varepsilon \frac{A}{d_0 + \delta} = \quad \text{Equation 3}$$

$$\varepsilon A \frac{2\delta}{d_0^2} \frac{1}{1 - \left(\frac{\delta}{d_0}\right)^2} = \varepsilon A \frac{2\delta}{d_0^2} \left(1 + \left(\frac{\delta}{d_0}\right)^2 + \left(\frac{\delta}{d_0}\right)^4 + \ldots \right)$$

Because the vertical distance "d0" is usually much larger than the displacement "$\delta$" ($d_0 >> \delta$), "$\delta/d_0$" can be neglected, so that Equation 3 is simplified into Equation 4.

$$\Delta C = \varepsilon A \frac{2\delta}{d_0^2}. \quad \text{Equation 4}$$

In Equation 4, the capacitance difference "$\Delta C$" is proportional to the displacement "$\delta$". Since the displacement "$\delta$" is proportional to the pressure acted on the diaphragm 9, it can be inferred that the capacitance difference "$\Delta C$" between the first and the second capacitor "C1" and "C2" is proportional to the pressure.

Figure 2B:
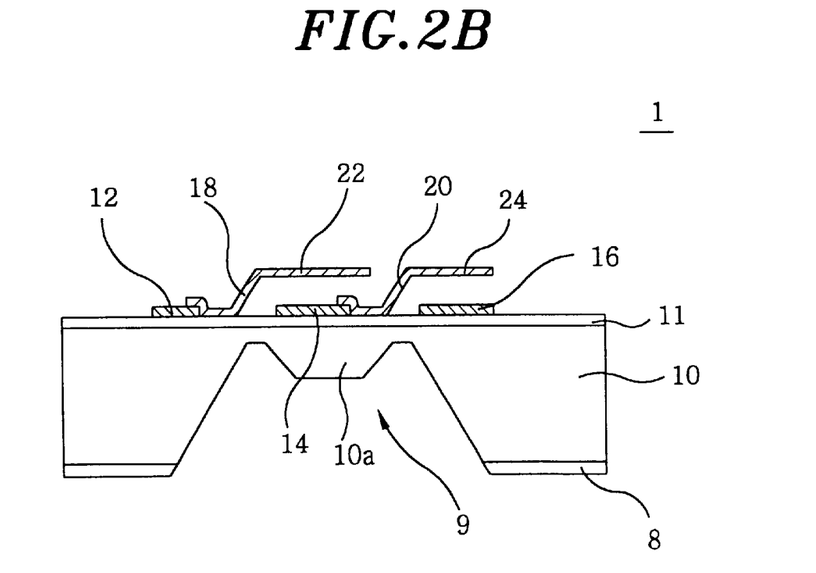

As shown in FIG. 2B, the differential capacitive pressure sensor 1 preferably has a center boss 10a disposed at the diaphragm 9. The center boss 10a is disposed under the first lower electrode 14. Without the center boss 10a disposed thereunder, a center portion of the diaphragm 9 may protrude upward or downward in response to the pressure acted thereon, such that the displacement differs between the first lower electrode 14 of the first capacitor "C1" and the second upper electrode 24 of the second capacitor "C2". That is to say, the center boss 10a serves to prevent an irregular deflection of the first lower electrode 14 of the first capacitor "C1". In the above-explained structure, the first lower electrode 14 of the first capacitor "C1" is disposed within the range of the center boss 10a.

Accordingly, when the diaphragm 9 is displaced in response to the pressure acted thereon, the capacitance difference occurs between the first and the second capacitor "C1" and "C2", so that the differential capacitive pressure sensor 1 in accordance with the preferred embodiments of the present invention can measure the pressure.

In the preferred embodiments of the present invention, the pressure acted on the diaphragm 9 reduces a vertical distance "$d_0$" between the upper and the lower electrode of the first capacitor "C1" and simultaneously increases that of the second capacitor "C2". Consequently, the first capacitance "$C1_0$" increases and the second capacitance "$C2_0$" decreases. The capacitance difference "$\Delta C$" is then amplified by a C-V converter having a switch capacitor circuit, so that a voltage output "$V_{out}$" that is proportional to the capacitance difference "$\Delta C$" can be obtained by Equation 5.

$$V_{out} = A_g \Delta C. \quad \text{Equation 5}$$

In Equation 5, "$A_g$" represents a gain of the circuit.

FIGS. 3A to 3G are cross-sectional views and FIGS. 4A to 4G are plan views showing a sequence of a fabrication process for the differential capacitive pressure sensor 1 of FIG. 1. FIGS. 4A to 4G are specifically top plan views except FIG. 4F, which is a bottom plan view.

Figure 3A:
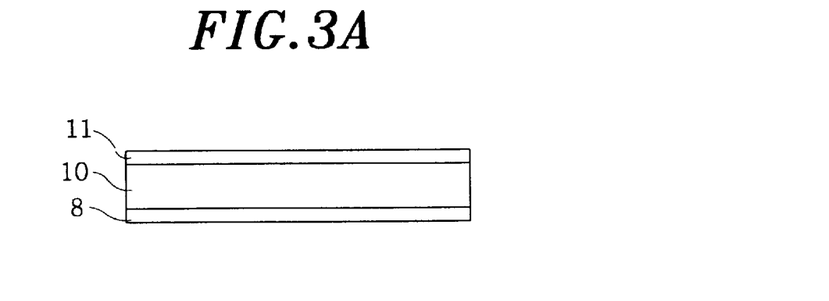
FIGS. 3A to 3G provide sectional views of the differential capacitive pressure sensor of FIG. 1.
Figure 4A:
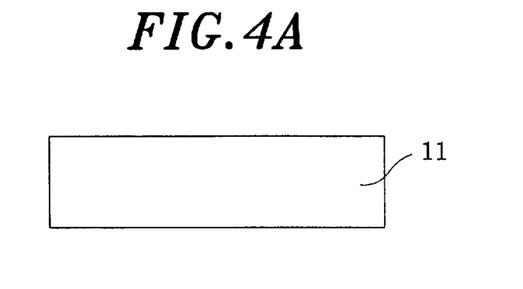
FIGS. 4A to 4G provide plan views thereof, corresponding to a sequence of a fabrication process therefor.

In FIGS. 3A and 4A, the upper insulating layer 11 and the lower insulating layer 8 are respectively formed on the top and bottom surface of the semiconductor substrate 10. The upper and the lower insulating layer 11 and 8, which are made of silicon oxide or silicon nitride, serve as a protecting layer when the substrate 10 is later etched.

Figure 3B:
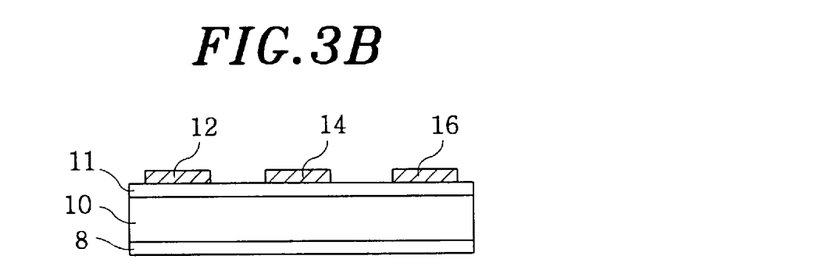
Figure 4B:
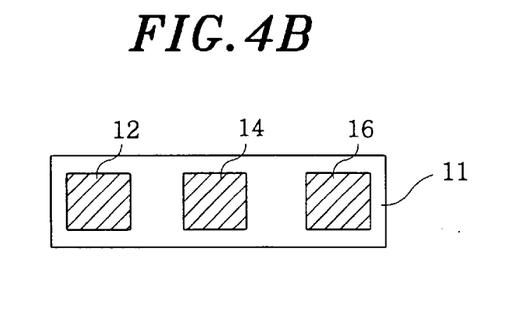

In FIGS. 3B and 4B, the outer electrode 12, the first lower electrode 14, and the second lower electrode 16 are formed on the upper insulating layer 11 at a predetermined interval disposed between adjacent electrodes. The outer electrode 12, the first lower electrode 14, and the second lower electrode 16 are made of conductive material, e.g., polysilicon, metal, or metallic oxide.

Figure 3C:
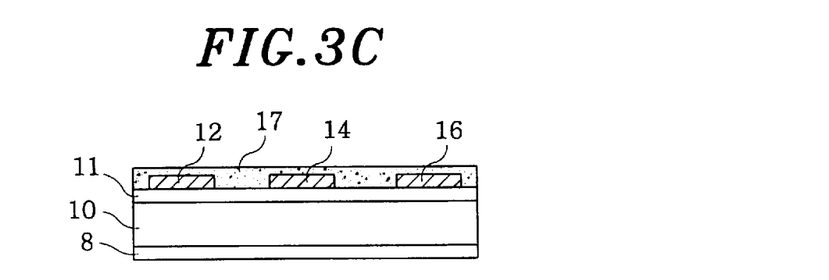
Figure 4C:
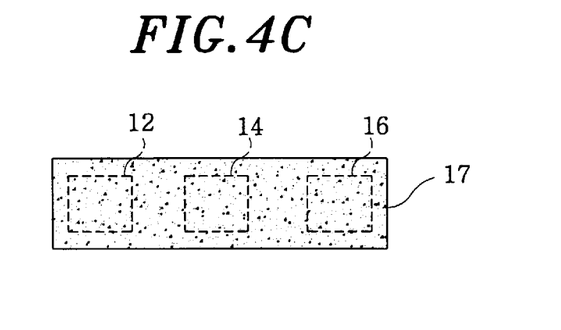

In FIGS. 3C and 4C, a sacrificial layer 17 is formed on the upper insulating layer 11 to cover the above-mentioned electrodes. The thickness of the sacrificial layer 17 is determined on the basis of intervals disposed between the electrodes. Material of the sacrificial layer 17 depends on the electrodes, and an insulating thin film such as silicon oxide, a metallic thin film, or a polymer thin film can be selected therefor.

Figure 3D:
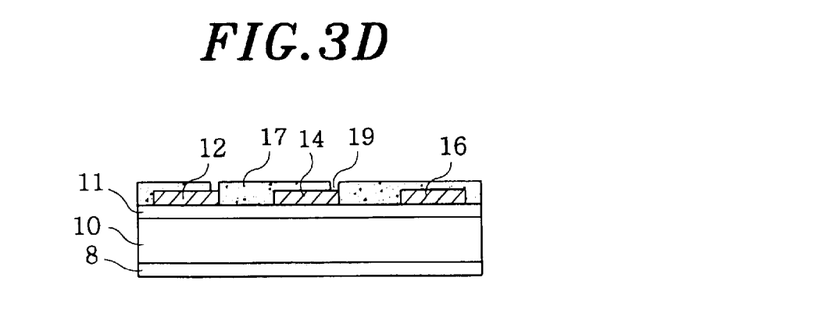
Figure 4D:
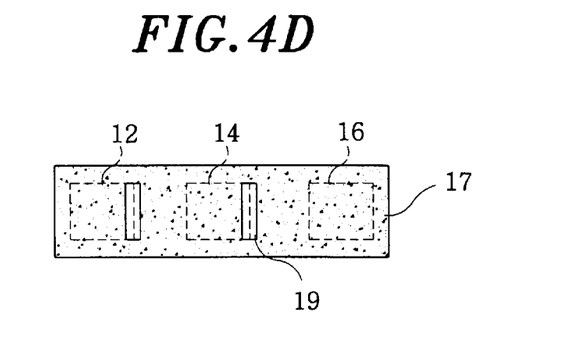

In FIGS. 3D and 4D, holes 19 are formed through the sacrificial layer 17, 50 that portions of the outer electrode 12, the first lower electrode 14 are uncovered.

Figure 3E:
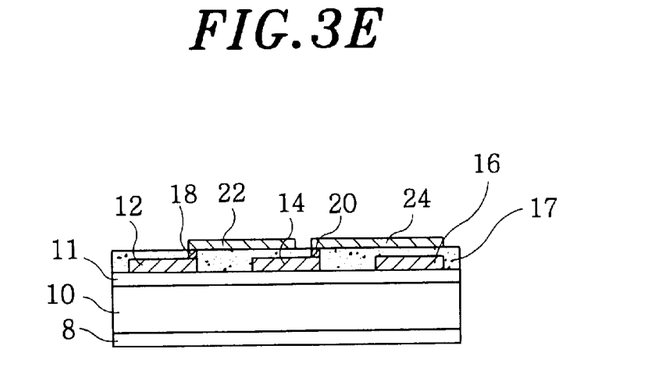
Figure 3F:
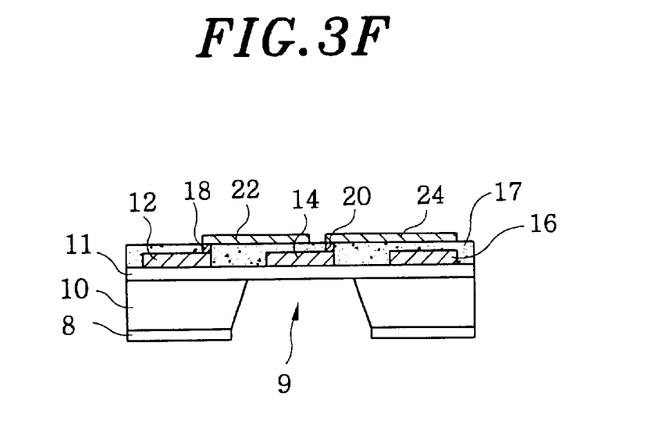
Figure 4E:
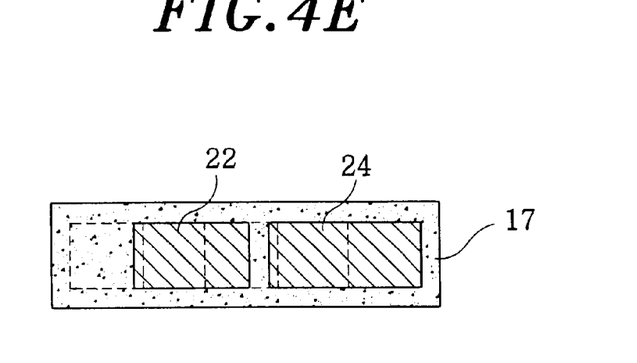
Figure 4F:
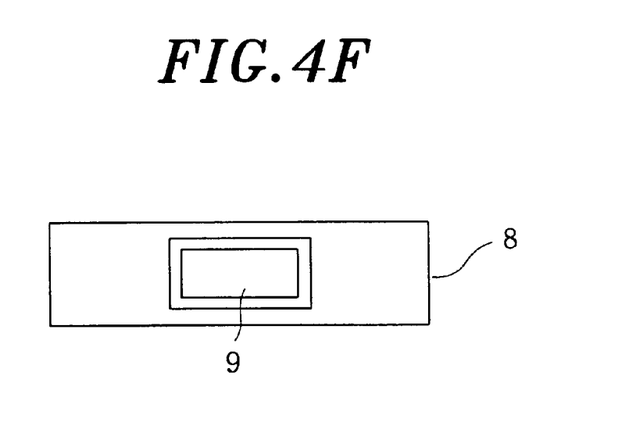

In FIGS. 3E and 4E, a conductive material is deposited and patterned on the sacrificial layer 17, so that the first upper electrode 22 and the second upper electrode 24 are formed. Portions of the conductive material are embedded inside the holes 19, thereby forming the first and the second supporting member 18 and 20. The first upper electrode 22 is connected to the outer electrode 12 via the first supporting member 18, and the second upper electrode 24 is connected to the first lower electrode 14 via the second supporting member 20. The first upper electrode 22 is arranged parallel to the first lower electrode 14, and the second upper electrode 24 is arranged parallel to the second lower electrode 16. The upper electrodes and the supporting members may be made of polysilicon, metal, or metallic oxide.

In the step of forming the upper electrodes, it is important to minimize the residual stress of a conductive layer before the layer is patterned to form the upper electrodes. If the residual stress of the conductive layer is high, the upper electrodes may be deflected after being formed, so that there occurs a residual difference in capacitances between the first and the second capacitor "C1" and "C2" (FIG. 2A). To prevent the above-explained problem, the electric plating may be used for forming a relatively thicker conductive layer, thereby increasing the strength of the upper electrodes In FIGS. 3F and 4F, the thickness of the semiconductor substrate 10 is reduced to form the diaphragm 9. In the step of forming the diaphragm 9, after the lower insulating layer 8 is patterned to expose a portion of the semiconductor substrate 10, the exposed portion thereof is etched away to be of a trench shape having a predetermined depth. The center boss 10a shown in FIG. 2B may be additionally formed in the above-explained step.

Figure 3G:
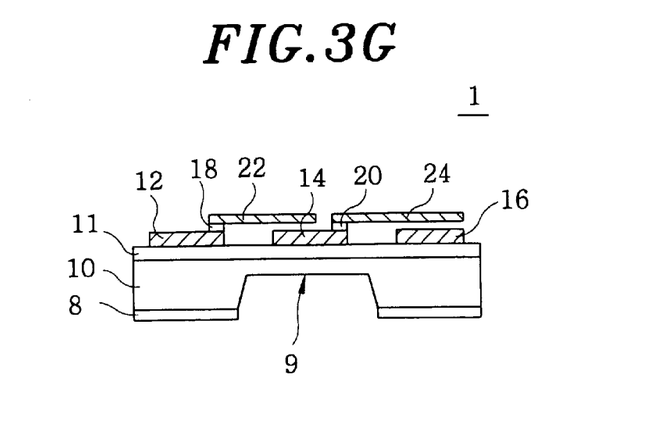
Figure 4G:
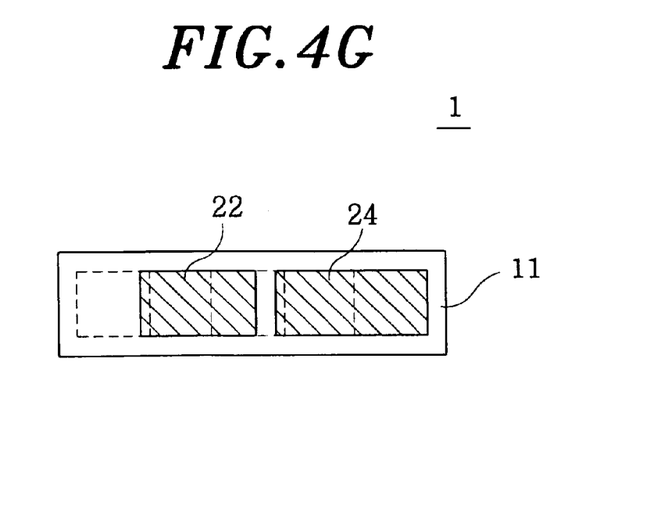

Finally, in FIGS. 3G and 4G, the sacrificial layer 17 is removed by employing a dry etching or a wet etching, so that the first and the second capacitor "C1" and "C2" (FIG. 2A) of the differential capacitive pressure sensor 1 are completed. To enhance the efficiency of etching the sacrificial layer 17, a multiplicity of through holes may be formed through the first and the second upper electrode 22 and 24.

Figure 5:
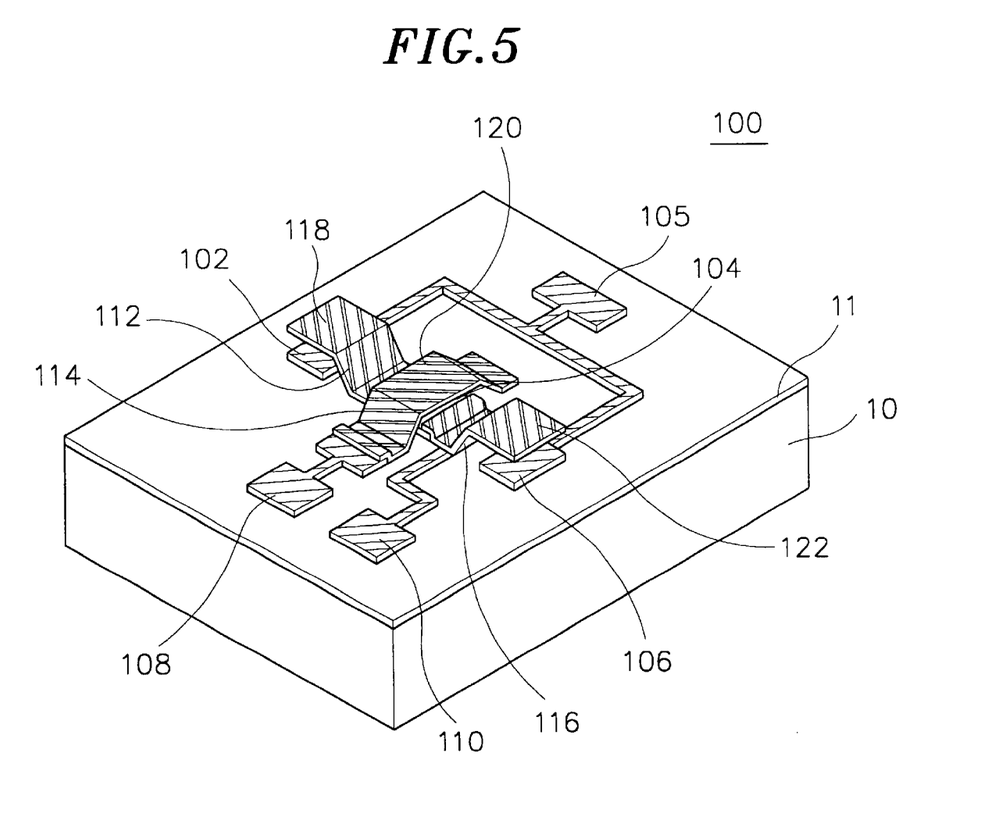
FIG. 5 depicts a perspective view of a differential capacitive pressure sensor in accordance with a second preferred embodiment of the present invention.

FIG. 5 is a perspective view showing a differential capacitive pressure sensor 100 in accordance with a second preferred embodiment of the present invention. In the second preferred embodiment, one of two sensing capacitors is divided.

The differential capacitive pressure sensor 100 in accordance with the second preferred embodiment of the present invention includes a semiconductor substrate 10, a first lower electrode 102, a second lower electrode 104, a third lower electrode 106, and a center electrode 108. The above-mentioned electrodes are formed on the semiconductor substrate 10 at a predetermined interval interposed between adjacent two electrodes. It is preferred that an insulating layer 11 is interposed between each of the above-mentioned electrodes and the semiconductor substrate 10. The differential capacitive pressure sensor 100 further includes a first upper electrode 118, a second upper electrode 120, and a third upper electrode 122, which are respectively disposed over the first to the third lower electrode 102, 104, and 106. Each upper electrode is parallel to a corresponding lower electrode.

The first upper electrode 118 is connected to a first end of the second lower electrode 104 via a first supporting member 112, which is downwardly extended from the first upper electrode 118. The second upper electrode 120 is connected to the center electrode 108 via a second supporting member 114, which is downwardly extended from the second upper electrode 120. The third upper electrode 122 is connected to a second end of the second lower electrode 104 via a third supporting member 116, which is downwardly extended from the third upper electrode 122.

The first lower electrode 102 and the third lower electrode 106 are electrically connected to a first bonding pad 105 disposed on the insulating layer 11. Via the first bonding pad 105, an electrical signal is applied to the first and the third lower electrode 102 and 106. The second lower electrode 104, the first upper electrode 118, and the third upper electrode 122 are electrically connected to a second bonding pad 110 disposed on the insulating layer 11. Via the second bonding pad 110, an electrical signal is applied to the second lower electrode 104, the first upper electrode 118, and the third upper electrode 122. Further, the center electrode 108 serves as a third bonding pad via which an electrical signal is applied to the second upper electrode 120.

In the differential capacitive pressure sensor 100 in accordance with the second preferred embodiment of the present invention, the first to the third lower electrode 102 to 106 are preferably arranged in a straight line. The center electrode 108 is preferably positioned adjacent to the straight line, and, more particularly, to the second lower electrode 104. The second upper electrode 120 crosses over the straight line, and, more particularly, over the second lower electrode 104.

Figure 6:
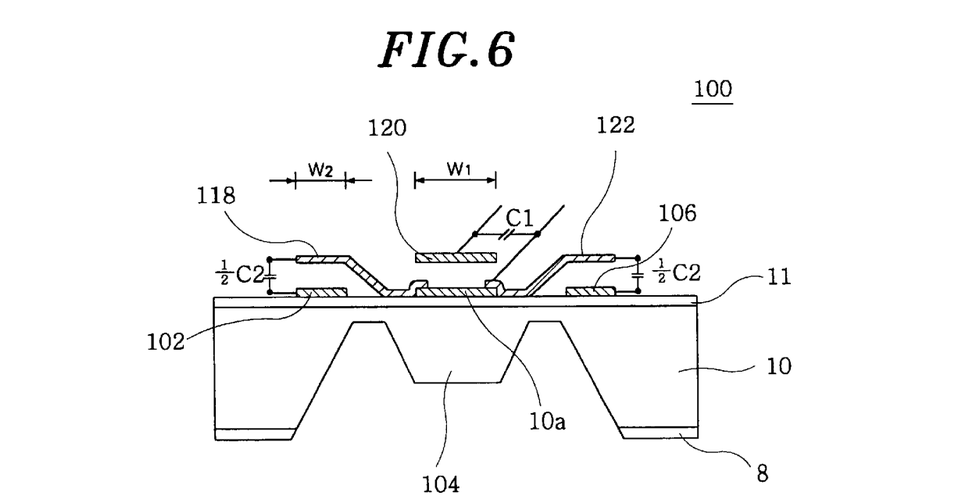
FIG. 6 is a vertical sectional view of the differential capacitive pressure sensor depicted in FIG. 4.

FIG. 6 is a sectional view of the differential capacitive pressure sensor 100 of FIG. 5. As shown, the second lower electrode 104 and the second upper electrode 120 form a first capacitor "C1". The first lower electrode 102 and the first upper electrode 118 form a first half of a second capacitor "C2", and the third lower electrode 106 and the third upper electrode 122 form a second half thereof. Accordingly, if the second capacitor "C2" implements a second capacitance "C2", each half of the second capacitor "C2" implements a half of the second capacitance "C2", that is, $$"\frac{1}{2}C2".$$

In the above-explained structure, the second lower electrode 104 has a first width "$W_1$" while each of the first and the third lower electrode 102 and 106 has a second width "$W_2$", which is about a half of the first width "$W_1$" ($W_1 = 2W_2$). In that case, each of the first and the third upper electrode 118 and 122 has a smaller plan area than that of the first upper electrode 22 or the second upper electrode 24 (FIG. 2A) of the differential capacitive pressure sensor 1 in accordance with the first preferred embodiment. When an upper electrode floating over a corresponding lower electrode has a relatively smaller plan area, a more stable structure and a more easy fabrication process for the differential capacitive pressure sensor can be achieved.

In addition, because the second capacitor "C2" is divided, each area of the first to the third supporting member 112 to 116 is relatively large such that each supporting member can more stably support a corresponding upper electrode. Consequently, when a sacrificial layer is removed or in another step of the fabrication process, the upper electrode rarely contracts toward a corresponding lower electrode, so that the upper electrode maintains a predetermined gap with respect to a corresponding lower electrode.

The differential capacitive pressure sensor 100 in accordance with the second preferred embodiment of the present invention may further include the diaphragm 9, which preferably has the center boss 10a. Since the diaphragm 9 and the center boss 10a are previously explained in detail, additional description thereof will be omitted.

FIGS. 7A to 7G are cross-sectional views and FIGS. 8A to 8G are plan views showing a sequence of a fabrication process for the differential capacitive pressure sensor 100 of FIG. 5. FIGS. 8A to 8G are specifically top plan views except FIG. 8F, which is a bottom plan view.

Figure 7A:
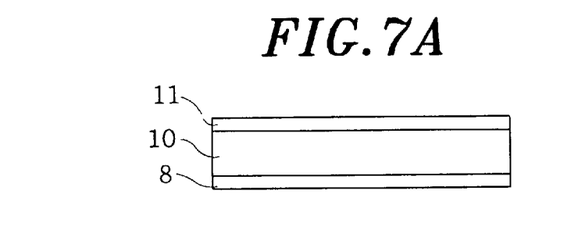
FIGS. 7A to 7G set forth sectional views of the differential capacitive pressure sensor of FIG. 4.
Figure 8A:
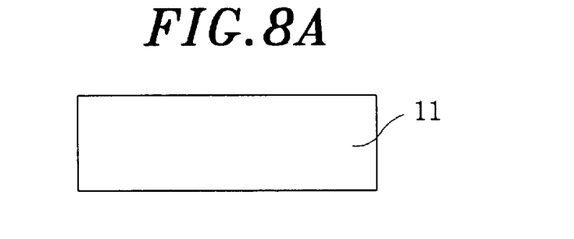
FIGS. 8A to 8G set forth plan views thereof, corresponding to a sequence of a fabrication process therefor.

In FIGS. 7A and 8A, the upper insulating layer 11 and the lower insulating layer 8 are respectively formed on the top and bottom surface of the semiconductor substrate 10. The upper and the lower insulating layer 11 and 8, which are silicon oxide or silicon nitride, serve as a protecting layer for protecting the substrate 10, which is later etched.

Figure 7B:
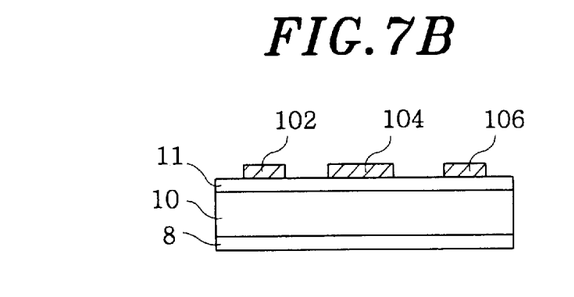
Figure 8B:
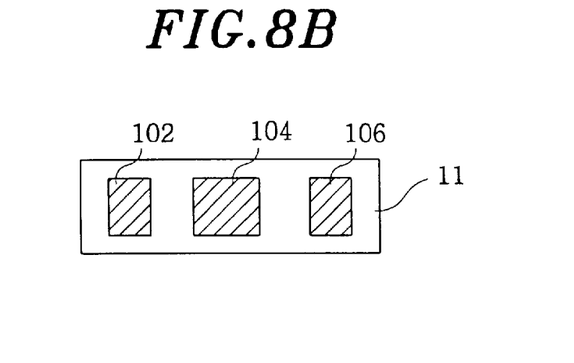

In FIGS. 7B and 8B, the first lower electrode 102, the second lower electrode 104, the third lower electrode 106, and the center electrode 108 (FIG. 5) are formed on the upper insulating layer 11 at a predetermined interval disposed between adjacent electrodes. The first lower electrode 102, the second lower electrode 104, the third lower electrode 106, and the center electrode 108 are made of conductive material, e.g., polysilicon, metal, or metallic oxide.

Figure 7C:
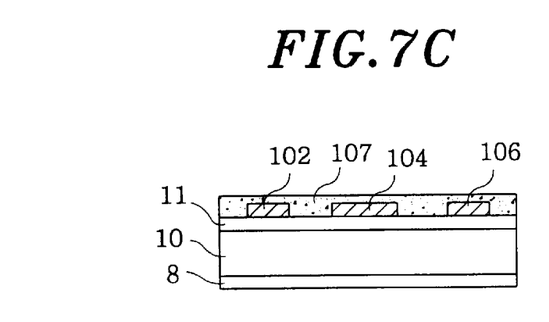
Figure 8C:
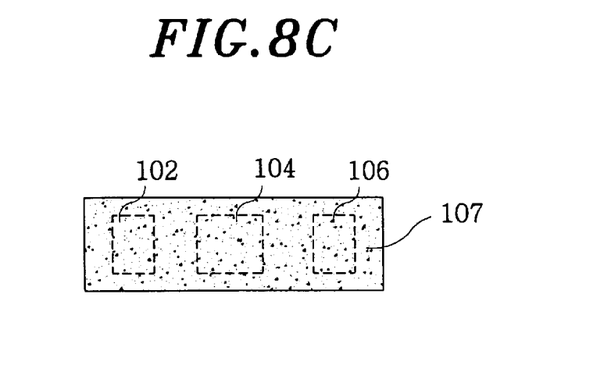

In FIGS. 7C and 8C, a sacrificial layer 107 is formed on the upper insulating layer 11 to cover the above-mentioned electrodes. The sacrificial layer 107 is an insulating thin film such as silicon oxide, a metallic thin film, or a polymer thin film.

Figure 7D:
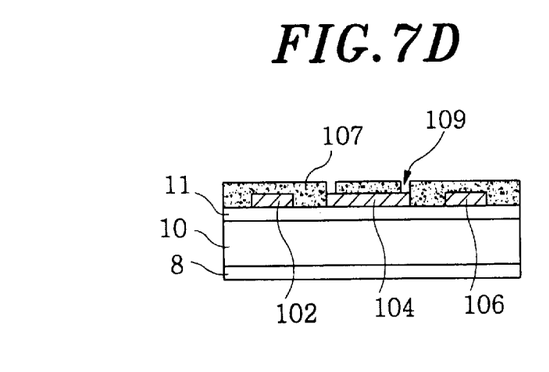
Figure 8D:
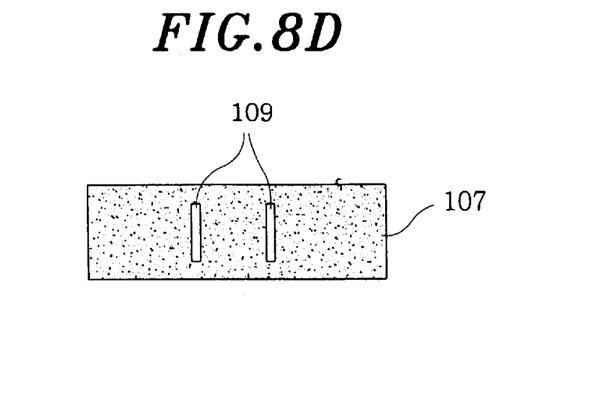

In FIGS. 7D and 8D, via holes 109 are formed through the sacrificial layer 107, so that both end portions of the second lower electrode 104 as well as one end portion of the center electrode 108 are partially uncovered.

Figure 7E:
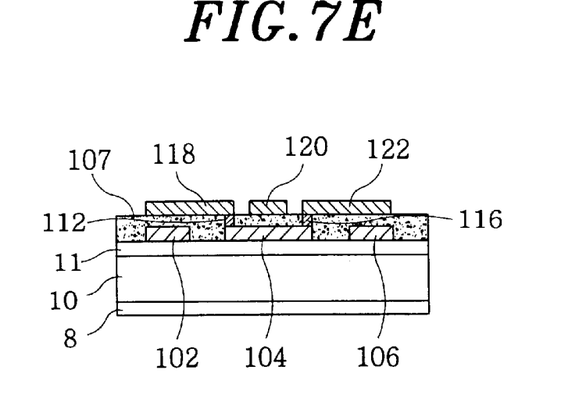
Figure 8E:
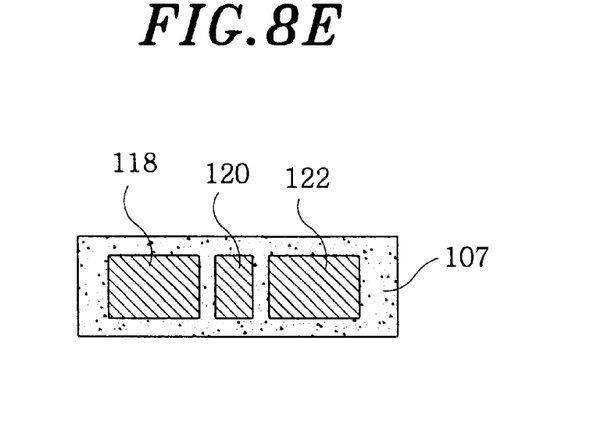

In FIGS. 7E and 8E, a conductive material is deposited and patterned on the sacrificial layer 107, 50 that the first upper electrode 118, the second upper electrode 120, and the third upper electrode 122 are formed. Portions of conductive material fill the holes 109, thereby forming the first to the third supporting member 112 to 116. The upper electrodes and the supporting members may be made of polysilicon, metal, or metallic oxide.

Figure 7F:
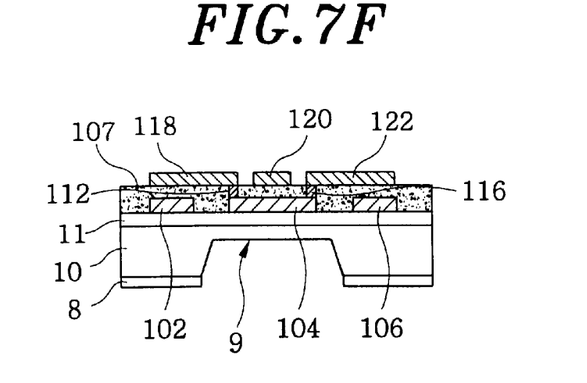
Figure 8F:
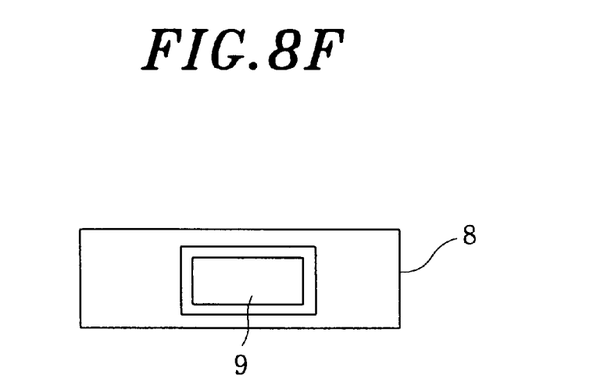

In FIGS. 7F and 8F, the thickness of the semiconductor substrate 10 is reduced to form the diaphragm 9. In the step of forming the diaphragm 9, after the lower insulating layer 8 is patterned to expose a portion of the semiconductor substrate 10, the exposed portion thereof is etched away to obtain a trench shape having a predetermined depth. The center boss 10a shown in FIG. 2B may be additionally formed in the above-explained step.

Figure 7G:
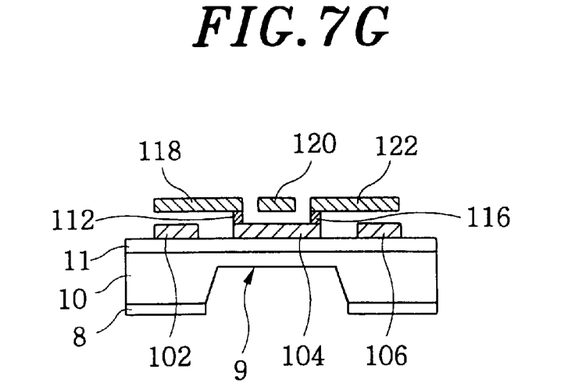
Figure 8G:
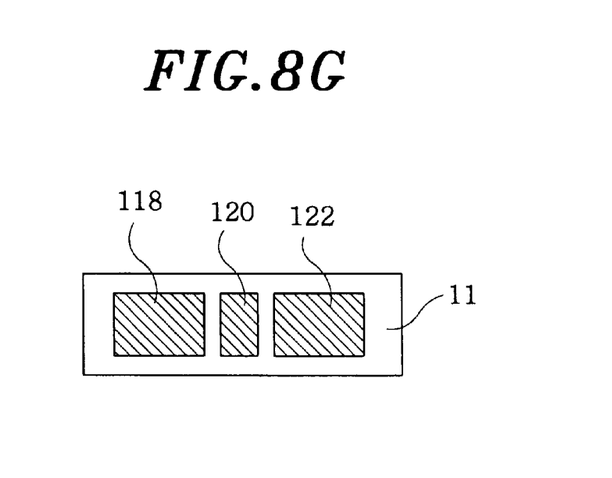

Finally, as shown in FIGS. 7G and 8G, the sacrificial layer 107 is removed by applying a dry etching or a wet etching to complete the differential capacitive pressure sensor 100 in accordance with the second preferred embodiment of the present invention.

While the invention has been shown and described with respect to the preferred embodiments, it will be understood by those skilled in the art that various changes and modifications may be made without departing from the spirit and scope of the invention as defined in the following claims.

What is claimed is:

1. A differential capacitive pressure sensor comprising:
   a substrate including a diaphragm positioned at a center portion thereof, the diaphragm having a reduced thickness;
   a first and a second lower electrode arranged on the substrate, the second lower electrode being positioned on the center portion and the first lower electrode being positioned outside the center portion;
   a first and a second upper electrode respectively floating over the first and the second lower electrode; and
   a first and a second supporting member downwardly extending from the first and the second upper electrode to support the first and the second upper electrode on the substrate, respectively, the first supporting member electrically connecting the first upper electrode to an outer electrode and the second supporting member electrically connecting the first lower electrode to the second upper electrode so that the first lower electrode and the second upper electrode are simultaneously movable parallel to the first upper electrode and the second lower electrode, respectively.

2. The pressure sensor of claim 1, wherein the first and the second supporting member are integrally formed with the first upper electrode and the second upper electrode, respectively.

3. The sensor of claim 1, wherein the diaphragm has a boss disposed under the second lower electrode.

4. A method for fabricating the differential capacitive pressure sensor of claim 1, the method comprising the steps of:
   forming the lower electrodes on the substrate;
   forming a sacrificial layer on the substrate to cover the lower electrodes;
   forming a plurality of holes passing through the sacrificial layer to uncover portions of the lower electrodes;
   forming the upper electrodes by depositing a conductive material on the sacrificial layer, the conductive material filling the holes so that the supporting members are formed; and
   removing the sacrificial layer.

5. The method of claim 4, further comprising a step of forming a diaphragm of the substrate, the diaphragm having a reduced thickness under one of the lower electrodes.

6. A differential capacitive pressure sensor comprising:
   a substrate including a diaphragm positioned at a center portion thereof, the diaphragm having a reduced thickness;
   a first to a third lower electrode arranged on the substrate, the second lower electrode being positioned on the center portion between the first and the third lower electrode which are located outside the center portion, the first lower electrode and the third lower electrode being electrically connected to each other;
   a first to a third upper electrode respectively floating over the first to the third lower electrode, the second upper electrode crossing over the second lower electrode; and
   a first to a third supporting member downwardly extending from the first to the third upper electrode to support the first to the third upper electrode, respectively, the first and the third supporting member electrically connecting the second lower electrode to the first and the third upper electrode.

7. The sensor of claim 6, wherein the first to the third lower electrode are arranged in a straight line, and the second upper electrode crosses over the second lower electrode.

8. The sensor of claim 6, wherein a sum of capacitances respectively involved with the first upper electrode and the third upper electrode is approximately same as a capacitance involved with the second upper electrode.

9. The sensor of claim 6, wherein the diaphragm has a boss disposed under the second lower electrode.

10. A method for fabricating the differential capacitive pressure sensor of claim 6, the method comprising the steps of:
    forming the lower electrodes on the substrate;
    forming a sacrificial layer on the substrate to cover the lower electrodes;
    forming a plurality of holes passing through the sacrificial layer to uncover portions of the lower electrodes;

forming the upper electrodes by depositing a conductive material on the sacrificial layer, the conductive material filling the holes so that the supporting members are formed; and removing the sacrificial layer.

11. The pressure sensor of claim 6, wherein a sum of the areas of the first upper electrode and the third upper electrode is approximately same as that of the second upper electrode.

* * * * *

UNITED STATES PATENT AND TRADEMARK OFFICE
CERTIFICATE OF CORRECTION

PATENT NO.     : 6,651,506 B2
DATED          : November 25, 2003
INVENTOR(S)    : Dae-Sung Lee et al.

It is certified that error appears in the above-identified patent and that said Letters Patent is hereby corrected as shown below:

<u>Title page</u>,
Item [30], Foreign Application Priority Data, should read as follows:
-- Jun. 9, 2001  (KR)          2001-32277 --

Signed and Sealed this

Twenty-fourth Day of February, 2004

JON W. DUDAS
*Acting Director of the United States Patent and Trademark Office*